F. FEINSTEIN & J. W. EWART.
ELECTRIC WEIGHING APPARATUS.
APPLICATION FILED AUG. 15, 1910.
994,733.
Patented June 13, 1911.
3 SHEETS—SHEET 1.
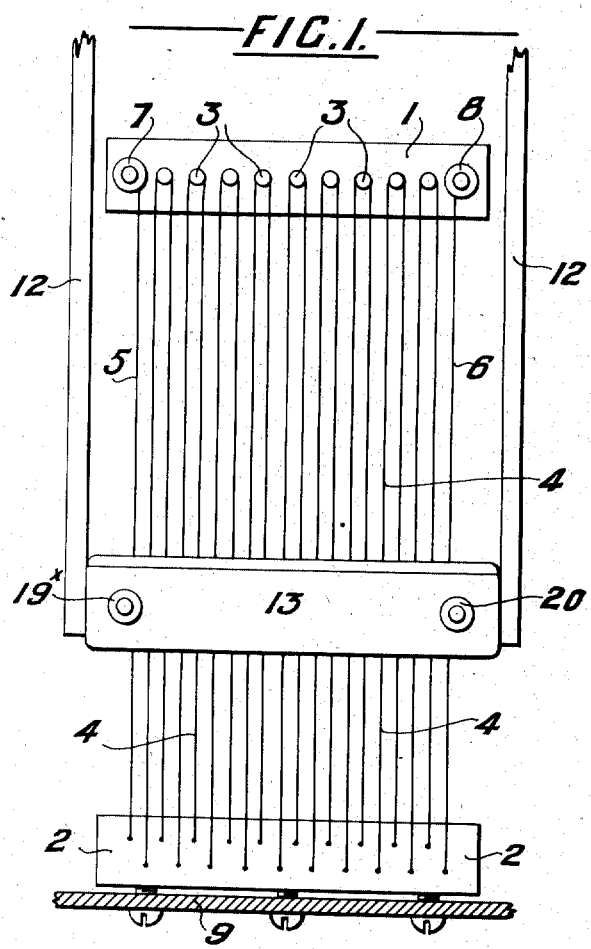
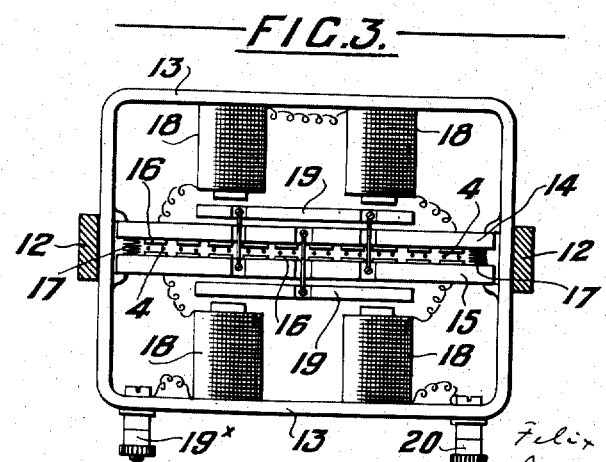

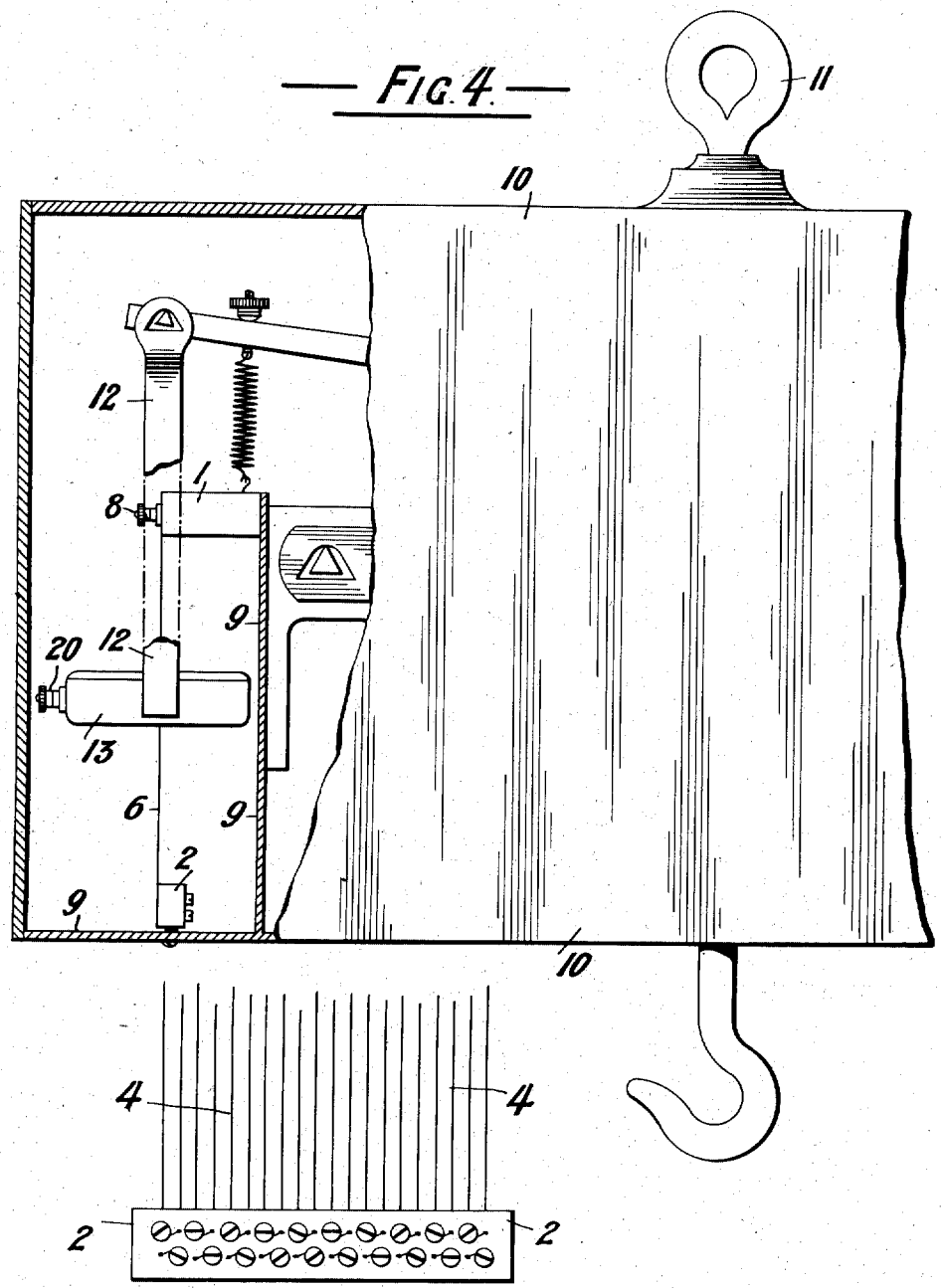

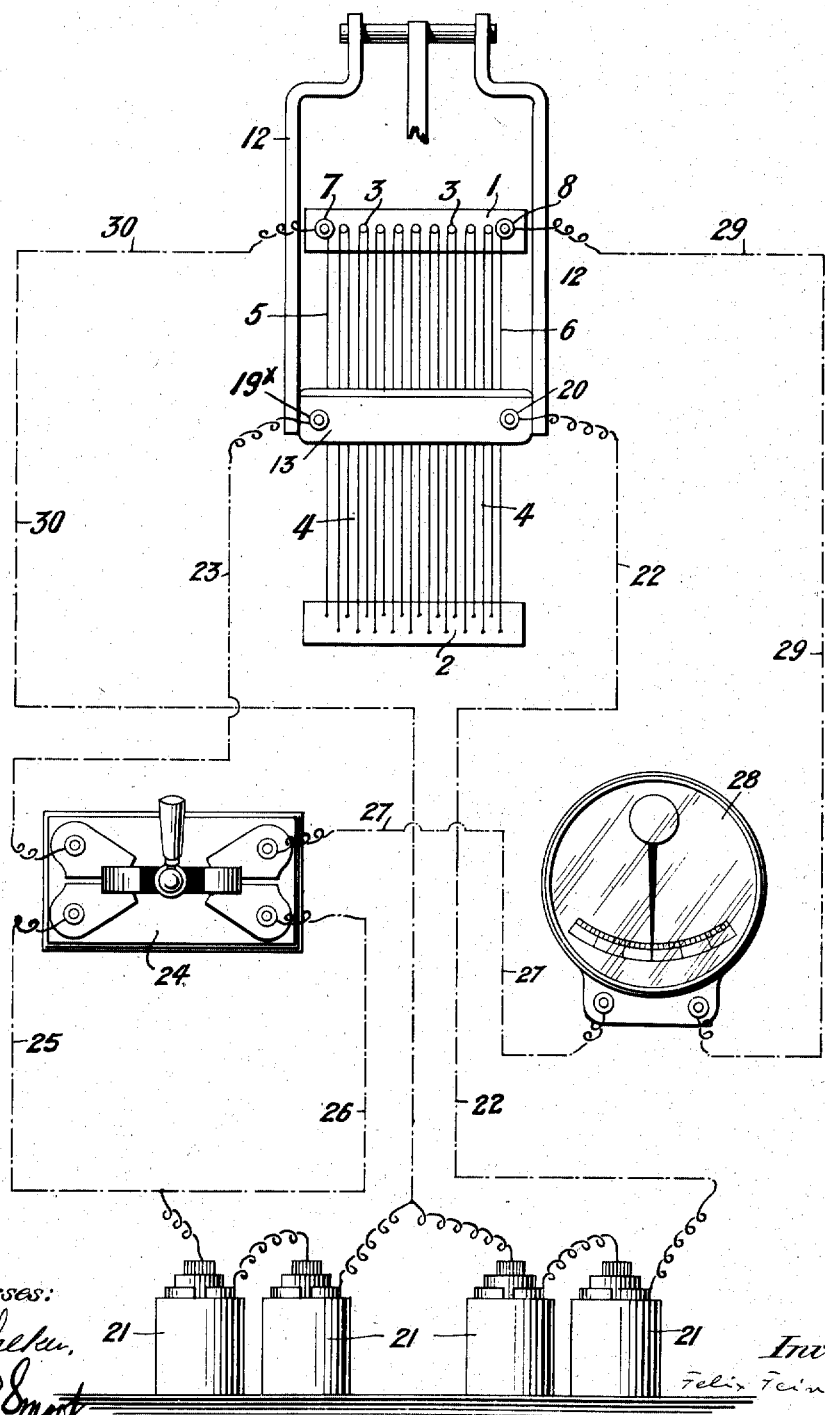

UNITED STATES PATENT OFFICE.

FELIX FEINSTEIN, OF LONDON, AND JOHN WILLIAM EWART, OF WENDOVER, ENGLAND.

ELECTRIC WEIGHING APPARATUS.

994,733.  Specification of Letters Patent.  Patented June 13, 1911.

Application filed August 15, 1910. Serial No. 577,245.

*To all whom it may concern:*

Be it known that we, FELIX FEINSTEIN and JOHN WILLIAM EWART, subjects of the King of Great Britain, residing, respectively, at Houndsditch, in the city of London, England, and Wendover, Buckinghamshire, England, have invented a certain new and useful Improved Electric Weighing Apparatus, and of which the following is a specification.

This invention relates to that kind of weighing apparatus in which the objects weighed have their weights indicated upon a dial situated at any convenient distance from the weighing machine, and in which such indication of the weights weighed is effected through the medium of variations of an electric current produced in concordance with, or bearing some relation to, the weights weighed.

According to the present invention we provide an insulating frame to carry a number of lengths of conducting wire, each length of wire having its two ends secured to one bar of the frame while it passes around a stud on another bar, so that the frame carries a number of parallel lengths of conducting wires in pairs extending in a vertical direction. There is also provided an outer wire upon one side and an outer wire upon the other side of the parallel series of wires, the ends of said outer wires being secured to the frame, and those ends of the two outer wires, adjacent to the studs aforesaid, are fitted with terminals which can be connected to a source of electricity in which there is also placed an ammeter with its dial suitably graduated.

Carried from some part of the weighing machine, which part moves or changes its position in accordance with the weights being weighed, we provide two bars suspended so as to extend transversely of the said wires carried by the frame, one bar upon one side and the other upon the other side of the said wires. The facing surfaces of these two bars carry oppositely arranged conducting plates of metal, and the bars are movable toward and away from each other, so that when moved toward each other they clamp the wires between their opposed conducting plates and thereby complete an electric circuit through the wires, the length of the circuit through the wires varying according to the position of the clamping bars.

The clamping bars are mounted in a suitable case or frame, which carries also electromagnets by which the bars can be drawn together, springs being provided to distance them apart, and the electro-magnets carried by the clamping bar frame can also be connected to a source of electricity, and a switch —preferably a double pole switch—is provided by which both the electro-magnets aforesaid and the parallel wires can be placed in circuit or disconnected. By such an apparatus the actual weighing operation is carried out before the current is switched on and when the clamping bars are not in contact with the wires, and thereby the bars do not produce friction thereon, and when the oscillations or vibrations of the weighing machine have ceased, the circuit is completed by the switch aforesaid, the clamping bars clamp the wires, and the weight is accurately ascertained and indicated.

The invention will be readily understood by further describing the same with reference to the accompanying drawings, whereon—

Figure 1 is an elevation to show the parallel wires carried by the frame, and the case or frame carrying the clamping bars; Fig. 2 being a rear elevation of the lower part of the clamping frame showing a means for securing the ends of the wires thereto. Fig. 3 is a sectional plan showing the case carrying the clamping bars. Fig. 4 is a sectional elevation of a weighing apparatus fitted with the improved electrical indicating device, and Fig. 5 is a diagram indicating some suitable electric connections.

Referring to Fig. 1, the insulating frame to carry the pairs of wires aforesaid is essentially composed of two bars 1, 2 of insulating material, of which the bar 1 carries a number of studs 3, and a number of wires 4 are provided, two ends of each wire being fixed in the frame 2 somewhat as shown at Figs. 1 and 2, while each length of wire 4 passes around one of the studs 3, and beyond this, single outer wires 5, 6 are provided, the upper ends being secured respectively to terminals 7, 8, while the lower ends of the wires 5, 6 are secured to the bar 2.

Means are preferably provided for distancing the bars 1, 2 in order to maintain the wires carried thereby at a suitable tension, and in the drawings as for instance at Fig. 4, the bar 1 is fixed to a part of the frame 9 of a weighing apparatus of any suitable construction, while the bar 2 is held by screws also passing through the frame 9, whereby the bar can be adjusted toward the said frame 9 and thereby the wires tensioned.

The frame or box 10 (Fig. 4) is provided with an eye-bolt 11 by which it may be suspended, and is fitted with any suitable multiplying system of levers as is well known in weighing machines, said levers being pivotally connected together and fulcrumed or carried in bearings in the box 10, all as is well known. From one end of this system of levers (Fig. 4) there is suspended upon knife-edge bearings, arms 12, the lower ends of which carry a case 13 which is shown in plan at Fig. 3. Within the case 13 there are carried two bars of insulating material 14, 15, each carrying a number of metal plates 16 on their facing surfaces, each plate upon one bar 14 facing a corresponding plate 16 on the other bar, and the bars are normally held apart by springs 17.

The wires 4, 5, 6 of the frame (Fig. 1) pass between the plates carried by these bars 14, 15, and the case 13 is moved in the longitudinal direction of the wires by the movement of the weighing mechanism. In order to cause the bars 14, 15 to clamp the wires 4, 5, 6, electro-magnets 18 are provided carried by the case 13 (Fig. 3), and the armatures 19 of these magnets are respectively connected one to the bar 15 and the other to the bar 14 by suitable connecting rods as indicated at Fig. 3, and the coils of the electro-magnets 18 are connected in series to the two terminals 19˟ and 20. With this apparatus, the electrical connections with some source of electricity, should be such that upon the article having been weighed and the weighing levers having ceased vibratory motion, the electro-magnets 18 are excited, causing the bars 14, 15 to clamp the wires 4, 5, 6, and the terminals 7, 8 are also placed in circuit so that the current passes through the wires in a circuitous course from the terminal 7 to the terminal 8, this circuit containing an ammeter suitably indexed, whereby the weight is indicated.

At Fig. 5 is shown by diagram, an example of the electrical connections such as we propose to employ, and from this it will be observed that from one of the four cells 21, connected in series, a conductor 22 proceeds to the terminal 20 of the case 13 to pass through the magnet coils 18, and from the opposite terminal 19˟ a conductor 23 proceeds to one terminal of any well known form of double pole switch 24, and when that switch is placed in connection, current proceeds by the conductor 25 to the opposite pole of the battery, and so arranged, the current from the whole of the four cells (which number is shown by way of example) passes through the circuit just enumerated. From one of the cells the conductor 26 passes to one of the terminals of the switch 24, while from the opposite terminal a conductor 27 proceeds to one terminal of an ammeter 28, from the opposite terminal of which a conductor 29 extends to one terminal 8 of the wire-carrying frame, and when the current is switched on, the current passes through all the lengths of wire above the clamping bars 14, 15 (the latter being closed together) and so passes by way of the contacting plates 16 (Fig. 3). From the opposite terminal 7 the current passes by a conductor 30 to one of the other cells of the battery, but so arranged, as will be observed, that the current passing through the wires of the frame 1, 2 is only that from two of the cells. With this arrangement, the article having been weighed and the weighing machine having become stationary, it is only necessary to turn the handle of the double pole switch 24 and the weight weighed will be indicated upon the dial of the ammeter 28.

What we claim as our invention and desire to secure by patent is:—

1. In apparatus for electrically indicating weights weighed; the combination with a weighing machine, an insulated stationary frame located adjacent to said machine, a plurality of separate lengths of conducting wire connected at both ends to one member of said frame, studs on the opposite parallel member of said frame around which said wires are passed to form a plurality of U-shaped strands, a single wire upon each side of said series of parallel strands forming a series of parallel conducting wires, both of said single wires being attached at their ends to said frame members, and a terminal connected to that end of each of said single wires adjacent to said studs and capable of connection to a source of electricity; of two clamping bars of insulating material, a case to carry said two clamping bars, means for suspending said case from a moving part of the weighing machine, said two clamping bars being located on opposite sides of said series of parallel conducting wires carried by said stationary frame, metal plates carried on the inner faces of said clamping bars, means for bringing said clamping bars together when the weighing operation has been effected by said machine to cause said metal plates to electrically connect pairs of said series of parallel wires, and an ammeter located in the electrical circuit between one of said terminals and said source of electricity, to measure the electrical resistance in said series of parallel wires corresponding to the position of said clamping bars on the said parallel wires, and to indicate the weight so ascertained, substantially as set forth.

2. In apparatus for electrically indicating weights weighed; the combination with a weighing machine, an insulated stationary frame located adjacent to said machine, a plurality of separate lengths of conducting wire connected at both ends to one member of said frame, studs on the opposite parallel member of said frame around which studs said wires are passed to form a plurality of U-shaped strands, a single wire upon each side of said series of parallel strands forming a series of parallel conducting wires, both of said single wires being attached at their ends to said frame members, and a terminal connected to that end of each of said single wires adjacent to said studs and capable of connection to a source of electricity; of two clamping bars of insulating material, a case to carry said two clamping bars, arms connected to said case, knife-edge bearings on a moving part of the weighing machine to engage ends of said arms to support the said case carried thereby, said two clamping bars being located on opposite sides of the series of parallel conducting wires carried by said stationary frame, metal plates carried on the inner faces of said clamping bars, means for bringing said clamping bars together when the weighing operation has been effected by said machine to cause said metal plates to electrically connect pairs of said series of parallel wires, and an ammeter located in the electrical circuit between one of said terminals and said source of electricity, to measure the electrical resistance in said series of parallel wires corresponding to the position of said clamping bars on the said parallel wires, and to indicate the weight so ascertained, substantially as set forth.

3. In apparatus for electrically indicating weights weighed; the combination with a weighing machine, an insulated stationary frame located adjacent to said machine, a plurality of separate lengths of conducting wire connected at both ends to one member of said frame, studs on the opposite parallel member of said frame around which studs said wires are passed to form a plurality of U-shaped strands, a single wire upon each side of said series of parallel strands forming a series of parallel conducting wires both of said single wires being attached at their ends to said frame members, and a terminal connected to that end of each of said single wires adjacent to said studs and capable of connection to a source of electricity; of two clamping bars of insulating material, a case to carry said two clamping bars, means for suspending said case from a moving part of the weighing machine, said two clamping bars being located on opposite sides of said series of conducting parallel wires carried by said stationary frame, metal plates carried on the inner faces of said clamping bars, electro-magnets carried by said case and adapted to draw the two clamping bars together to cause said metal plates to electrically connect pairs of said series of parallel wires, electric conductors for connecting said electro-magnets to a source of electricity to energize said electro-magnets when the weighing operation has been effected by said machine, and an ammeter located in said electrical circuit between one of said terminals and said source of electricity, to measure the electrical resistance in said series of parallel wires corresponding to the position of said clamping bars on the said parallel wires, and to indicate the weight so ascertained, substantially as set forth.

4. In apparatus for electrically indicating weights weighed; the combination with a weighing machine, an insulated stationary frame located adjacent to said machine, a plurality of separate lengths of conducting wire connected at both ends to one member of said frame, studs on the opposite parallel member of said frame around which studs said wires are passed to form a plurality of U-shaped strands, a single wire upon each side of said series of parallel strands forming a series of parallel conducting wires, both of said single wires being attached at their ends to said frame members, and a terminal connected to that end of each of said single wires adjacent to said studs and capable of connection to a source of electricity; of two clamping bars of insulating material, a case to carry said two clamping bars, means for suspending said case from a moving part of the weighing machine, said two clamping bars being located on opposite sides of said series of parallel conducting wires carried by said stationary frame, metal plates carried on the inner faces of said clamping bars, electro-magnets carried by said case and adapted to draw the two clamping bars together to cause said metal plates to electrically connect pairs of said series of parallel wires, electric conductors for connecting said electro-magnets to a source of electricity, a switch adapted to close the circuit through said conductors and electro-magnets to energize said electro-magnets when the weighing operation has been effected by said machine, and an ammeter located in the electrical circuit between one of said terminals and said source of electricity, to measure the electrical resistance in said series of parallel wires corresponding to the position of said clamping bars on the said parallel wires, and to indicate the weight so ascertained, substantially as set forth.

5. In apparatus for electrically indicating weights weighed; the combination with a weighing machine, an insulated stationary frame located adjacent to said machine, a plurality of separate lengths of conducting wire connected at both ends to one member of said frame, studs on the opposite parallel member of said frame around which studs said wires are passed to form a plurality of U-shaped strands, a single wire upon each side of said series of parallel strands forming a series of parallel conducting wires, both of said single wires being attached at their ends to said frame members, a terminal connected to that end of each of said single wires adjacent to said studs and capable of connection to a source of electricity; of two clamping bars of insulating material, a case to carry said two clamping bars, means for suspending said case from a moving part of the weighing machine, said two clamping bars being located on opposite sides of said series of parallel conducting wires carried by said stationary frame, metal plates carried on the inner faces of said clamping bars, means for normally holding the clamping bars apart, electro-magnets carried by said case, armatures carried by said clamping bars and adapted to be attracted by said electro-magnets to draw the two clamping bars together and cause said metal plates to connect pairs of said series of parallel wires, electric conductors for connecting said electro-magnets to a source of electricity to energize said electro-magnets when the weighing operation has been effected by said machine, and an ammeter located in the electrical circuit between one of said terminals and said source of electricity, to measure the electrical resistance in said series of parallel wires corresponding to the position of said clamping bars on the said parallel wires, and to indicate the weight so ascertained, substantially as set forth.

6. A machine for electrically indicating weights weighed comprising in combination; a casing, a system of weighing levers within said casing, means connected at one end of the system of levers for carrying the article to be weighed, an insulated stationary frame within said casing, a plurality of separate lengths of conducting wire connected at both ends to one member of said frame, studs on the opposite parallel member of said frame around which studs said wires are passed to form a plurality of U-shaped strands, a single wire upon each side of said series of parallel strands forming a series of parallel conducting wires both of said single wires being attached at their ends to said frame members, a terminal connected to that end of each of said single wires adjacent to said studs and capable of connection to a source of electricity, two clamping bars of insulating material, a case to carry said two clamping bars, arms connected to said case, knife-edge bearings on the free end of the lever at the other end of the system of weighing levers, means on the ends of the said arms to engage said bearings to support said case, said two clamping bars being located on opposite sides of said series of parallel conducting wires carried by said stationary frame, metal plates carried on the inner faces of said clamping bars, means for holding the clamping bars apart, electro-magnets carried by said case, armatures carried by said clamping bars and adapted to be attracted by said electro-magnets to draw the two clamping bars together and cause said metal plates to connect pairs of said series of parallel wires, electric conductors for connecting said electro-magnets to a source of electricity, a switch adapted to close the circuit through said conductors and electro-magnets to energize said electro-magnets when the weighing operation has been effected by said machine, and an ammeter located in the electric circuit between the terminals of said insulated frame and including the source of electricity, to measure the electric resistance in the said series of parallel wires corresponding to the position of the clamping bars on said parallel wires, and to indicate the weight so indicated, substantially as set forth.

In witness whereof we have hereunto set our hands in the presence of two witnesses.

FELIX FEINSTEIN.
JOHN WILLIAM EWART.

Witnesses:
THOMAS WILLIAM ROGERS,
WILLIAM A. MARSHALL.